(12) United States Patent
Senthivel et al.

(10) Patent No.: US 8,634,306 B2
(45) Date of Patent: Jan. 21, 2014

(54) SYSTEMS AND METHODS FOR IMPLEMENTING SERVICE OPERATION, ADMINISTRATION, AND MANAGEMENT FOR HAIRPINNED ETHERNET SERVICES

(75) Inventors: Kumaravel Senthivel, Murphy, TX (US); Calvin Wan, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 183 days.

(21) Appl. No.: 13/216,638

(22) Filed: Aug. 24, 2011

(65) Prior Publication Data
US 2013/0051243 A1 Feb. 28, 2013

(51) Int. Cl.
H04L 12/26 (2006.01)
(52) U.S. Cl.
USPC .................. 370/241.1; 370/250; 370/351
(58) Field of Classification Search
USPC ................. 370/241, 241.1, 250, 351
See application file for complete search history.

(56) References Cited

U.S. PATENT DOCUMENTS

| 7,889,754 | B2 * | 2/2011 | Dec et al. ................. 370/432 |
| 8,243,608 | B2 * | 8/2012 | Tausanovitch et al. .... 370/241.1 |
| 2007/0014290 | A1 * | 1/2007 | Dec et al. ................. 370/390 |
| 2011/0164505 | A1 * | 7/2011 | Salam et al. ............... 370/241 |
| 2012/0014263 | A1 * | 1/2012 | Unger et al. ............... 370/248 |
| 2012/0182900 | A1 * | 7/2012 | Davari ....................... 370/254 |

OTHER PUBLICATIONS

IEEE; "802.1ag Standard"; IEEE Computer Society; pp. 260, Dec. 17, 2007.

* cited by examiner

*Primary Examiner* — Phuc Tran
(74) *Attorney, Agent, or Firm* — Baker Botts L.L.P.

(57) ABSTRACT

In accordance with embodiments of the present disclosure, a method may include designating one of at least one maintenance point associated with a physical port of a line card as a primary maintenance point, the primary maintenance point comprising either a UP-Maintenance Entity Group End Point (UP-MEP) or one Maintenance Entity Group Intermediate Point (MIP). The method may also include configuring the line card such that the line card stores source addresses of Service Operation, Administration, and Management (SOAM) frames communicated by the primary maintenance point. The method may further include configuring the line card such that the line card does not store source addresses of Service Operation, Administration, and Management frames communicated by maintenance points associated with the physical port other than the primary maintenance point.

21 Claims, 3 Drawing Sheets ure

US 8,634,306 B2

SYSTEMS AND METHODS FOR IMPLEMENTING SERVICE OPERATION, ADMINISTRATION, AND MANAGEMENT FOR HAIRPINNED ETHERNET SERVICES

TECHNICAL FIELD OF THE INVENTION

The present invention relates generally to networked communications and, more particularly, to implementing Service Operation, Administration, and Management for hairpinned Ethernet services.

BACKGROUND

A communication network may include network elements that route packets through the network. Some network elements may include a distributed architecture, wherein packet processing may be distributed among several subsystems of the network element (e.g., line cards).

Service Operation, Administration, and Management ("Service OAM" or "SOAM"), is defined by IEEE 802.1ag and defines Maintenance Entity Group End Points (MEPs) and Maintenance Entity Group Intermediate Points (MIPs) that may be provisioned on a network element. Throughout this disclosure, MEPs and MIPs may generally be referred to as "maintenance points." A maintenance point may be associated with a particular maintenance level (e.g., 0 to 7) and may be configured to communicate traffic, for example continuity check messages (CCMs), to a peer maintenance point at the same maintenance level that resides in the communication network. CCMs may be periodically communicated between maintenance points at the same maintenance level, and a service is considered down if a maintenance point does not receive a CCM from its peer maintenance point within a certain time.

Oftentimes, a maintenance point may be provisioned and associated with a particular port of a multi-port line card. In implementations in which two or more ports of the multi-port line card are part of a flooding domain, the ports may support intra-interface communication of traffic or "hairpinning" in which traffic ingressing via one physical port of a line card may egress from the same physical port of the line card. SOAM services may also be hairpinned, allowing hairpinned communication of service messages.

However, behavior of hairpinned services is not defined by existing communications standards. In addition, under existing standards, CCMs communicated by maintenance points may continuously update a Media Access Control (MAC) address table residing on a line card that associates maintenance points with particular MAC addresses for line cards for which the maintenance points are resident. Thus, when traffic arriving at a line card requires a MAC address look up, the MAC address table will return a MAC address based on the last received frame (e.g., CCM message frame). Because each maintenance point may maintain its own state machine (e.g., for determining the presence of CCMs and other service messages), problems may occur related to loopback, linktrace, and/or other messages associated with the various maintenance points when services are hairpinned. For example, a maintenance point provisioned on a line card of a network element may communicate a message (e.g., loopback or linktrace message) to a remote node in a communication network. A reply to the message may arrive back at the network element and may be forwarded to: (i) the maintenance point sending the original message, or (ii) another maintenance point on the same port in the event an intervening message processed by the line card updates the MAC address table to associate the MAC address of the port with another maintenance point on the same port. As another example, if a multicast message (e.g., loopback or linktrace message) is received at a network element having a plurality of maintenance points provisioned on a physical port, or if a unicast message (e.g., loopback or linktrace message) is received at a network element having a plurality of maintenance points provisioned on a physical port wherein the MAC address of the line card has not yet been learned, the message may be flooded to each of the plurality of provisioned maintenance points, and all such maintenance points may in turn communicate a reply message back to the source of the original message. Thus, due to many maintenance points sharing MAC addresses, hairpinning may adversely affect loopback or linktracing of circuits in a flooding domain, as it may affect learning of MAC addresses.

SUMMARY

In accordance with embodiments of the present disclosure, a method may include designating one of at least one maintenance point associated with a physical port of a line card as a primary maintenance point, the primary maintenance point comprising either a UP-Maintenance Entity Group End Point (UP-MEP) or one Maintenance Entity Group Intermediate Point (MIP). The method may also include configuring the line card such that, for the physical port, the line card stores source addresses of Service Operation, Administration, and Management (SOAM) frames communicated by the primary maintenance point. The method may further include configuring the line card such that the line card does not store source addresses of Service Operation, Administration, and Management frames communicated by maintenance points associated with the physical port other than the primary maintenance point.

One or more technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
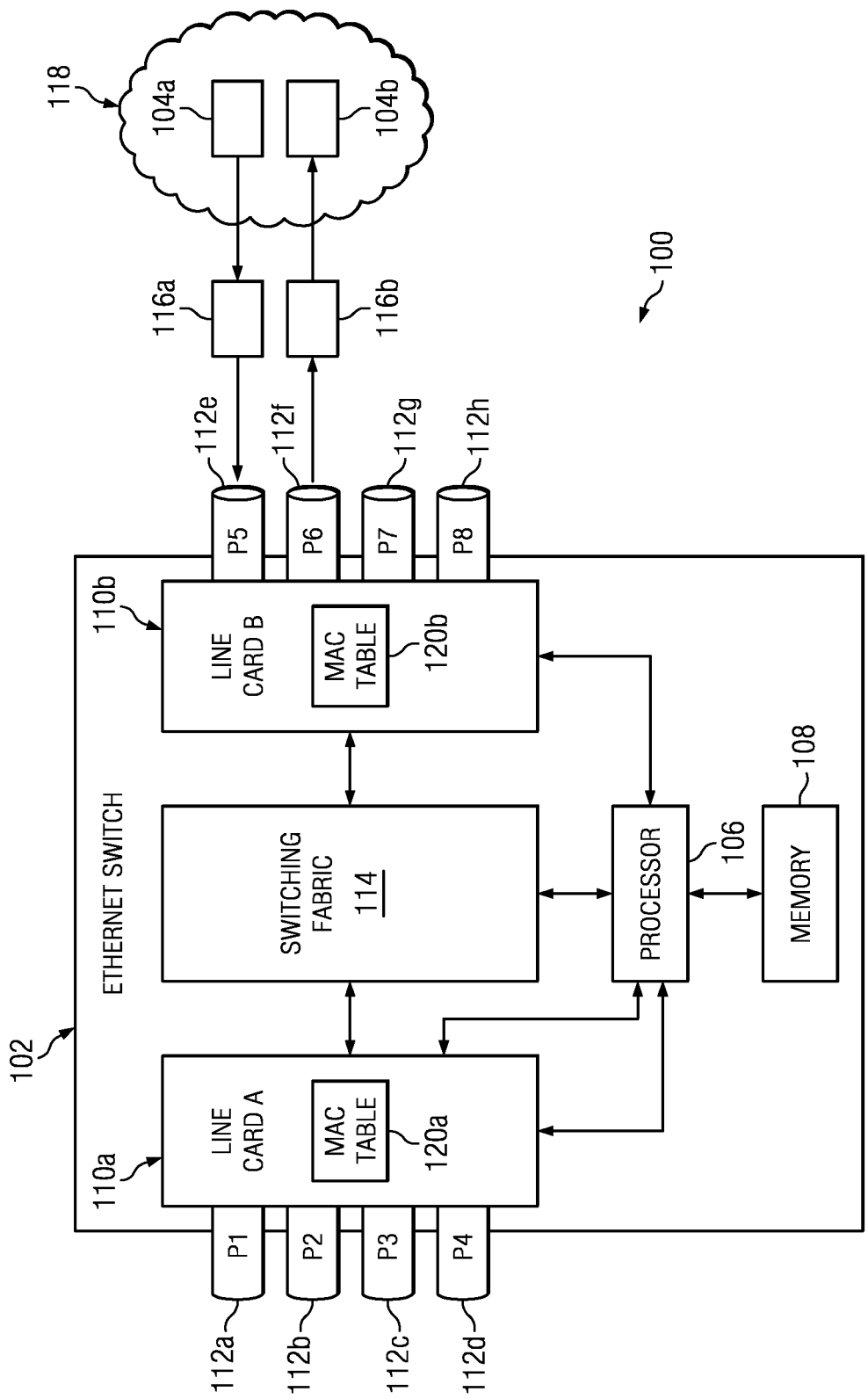
FIG. 1 is an example of a switching system based upon a switch configured to forward information between networks, computing entities, or other switching entities, in accordance with embodiments of the present disclosure.

FIG. 1 is an example of a switching system 100 based upon a switch 102 configured to forward information between networks, computing entities, or other switching entities. Switch 102 may include one or more logical ports 112, each communicatively coupled to one or more network entities 104. Such coupling may be accomplished over a network 118. Switch 102 may include one or more line cards 110, coupled to each other by way of a switching fabric 114. Switch 102 may include a table 120 specific to each line card 110. Tables 120 may include communication and forwarding information regarding network entities connected to logical ports 112 for which addresses have been learned. Switch 102 may include a processor 106 coupled to a memory 108. Processor 106 may be coupled to switching fabric 114 and the line cards 110.

Inbound frame 116a may be implemented in packets, frames, cells, or other received data to be forwarded. When an inbound frame 116a is received into a given logical port 112, the destination of the information may be looked up in table 120 to determine which logical port 112 the information should be sent. As demonstrated in FIG. 1 and in subsequent figures, inbound frame 116a may be received on any suitable logical port 112 of switch 102.

Switch 102 may be implemented in any suitable electronic device for carrying out the embodiments taught by the present disclosure. In one embodiment, switch 102 may be implemented as an Ethernet switch. Switch 102 may be configured to receive information to be forwarded to network destinations, and the information may be implemented in any form suitable for switch 102 to forward. In one embodiment, the information received may be implemented in an inbound frame 116a. Likewise, switch 102 may be configured to forward information in any suitable form, and likely the same form in which it was received. In one embodiment, the forwarded information may be implemented in an outbound frame 116b.

Switch 102 may be configured to communicate with any suitable network entity 104 to receive and send information such as frames 116. Network entities 104 may be embodied by, for example, a computer, router, switch, network device, sub-network or network. Network 118 may be embodied by, for example, a local-area-network, wide-area-network, the Internet, an intranet, or any other suitable communications network. Switch 102 may be configured to send and receive information through logical ports 112 on their respective line cards 110. Switch 102 may be configured to determine upon receipt of a frame 116a, which of the logical ports 112 should the outbound frame 116b be sent, based in part upon the contents of tables 120 associated with each line card. Switch 102 may be configured to act upon received information by the configuration of line cards 110, switching fabric 114, and/or processor 106.

Line cards 110 may be implemented in any suitable manner to create the embodiments described in this disclosure. In one embodiment, line cards 110 may be implemented in a module including electronic circuitry, processors, and/or memory for handling communications through one or more logical ports 112. Each line card 110 may contain a table 120. In one embodiment, each table 120 may be implemented in the corresponding line card 110, such as being stored in a memory associated with the line card 110. In another embodiment, table 120 may be implemented elsewhere in switch 102. Line card 110 may be configured to determine to what other line cards 110 in switch 102, information received from logical port 112 should be forwarded. Line card 110 may be configured to make such determinations based on the contents of an associated table 120. Line card 110 may be configured to forward information received from logical port 112 to another line card 110 of switch 102 through switching fabric 114. Switching fabric 114 may be implemented in any suitable combination of hardware and software for connecting line cards 110 to each other to transmit information between the line cards 110. Switching fabric 114 may be controlled through configuration by processor 106.

Processor 106 may comprise, for example, a microprocessor, microcontroller, digital signal processor (DSP), application specific integrated circuit (ASIC), or any other digital or analog circuitry configured to interpret and/or execute program instructions and/or process data. Processor 106 may interpret and/or execute program instructions and/or process data stored in memory 108. Memory 108 may comprise any system, device, or apparatus configured to hold and/or house one or more memory modules. Each memory module may include any system, device or apparatus configured to retain program instructions and/or data for a period of time (e.g., computer-readable media). In one embodiment, each line card 110 may contain one or more memory modules, containing at least an associated table 120. In another embodiment, each line card 110 may share memory 108 to store tables 120.

Tables 120 may be implemented in any suitable manner to store and make available to switch 102 and line cards 110 information concerning other network entities 104 in switching system 100 and how the network entities 104 may be accessed through logical ports 112. Tables 120 may include, for example, information regarding addresses of network entities 104, information regarding flooding domains 202, and information regarding which logical port 112, the address may be reached. Tables 120 may be configured as forwarding tables to provide information to switch 102 on how to forward information to other entities. In one embodiment, each table 120 may be implemented in its respective line card 110. In another embodiment, tables 120 may be implemented together, but coupled to each line card 110. Tables 120 may be implemented, for example, in logic, a memory, or circuitry. If a table 120 is implemented in a line card 110, table 120 may be implemented in memory of line card 110.

Figure 2:
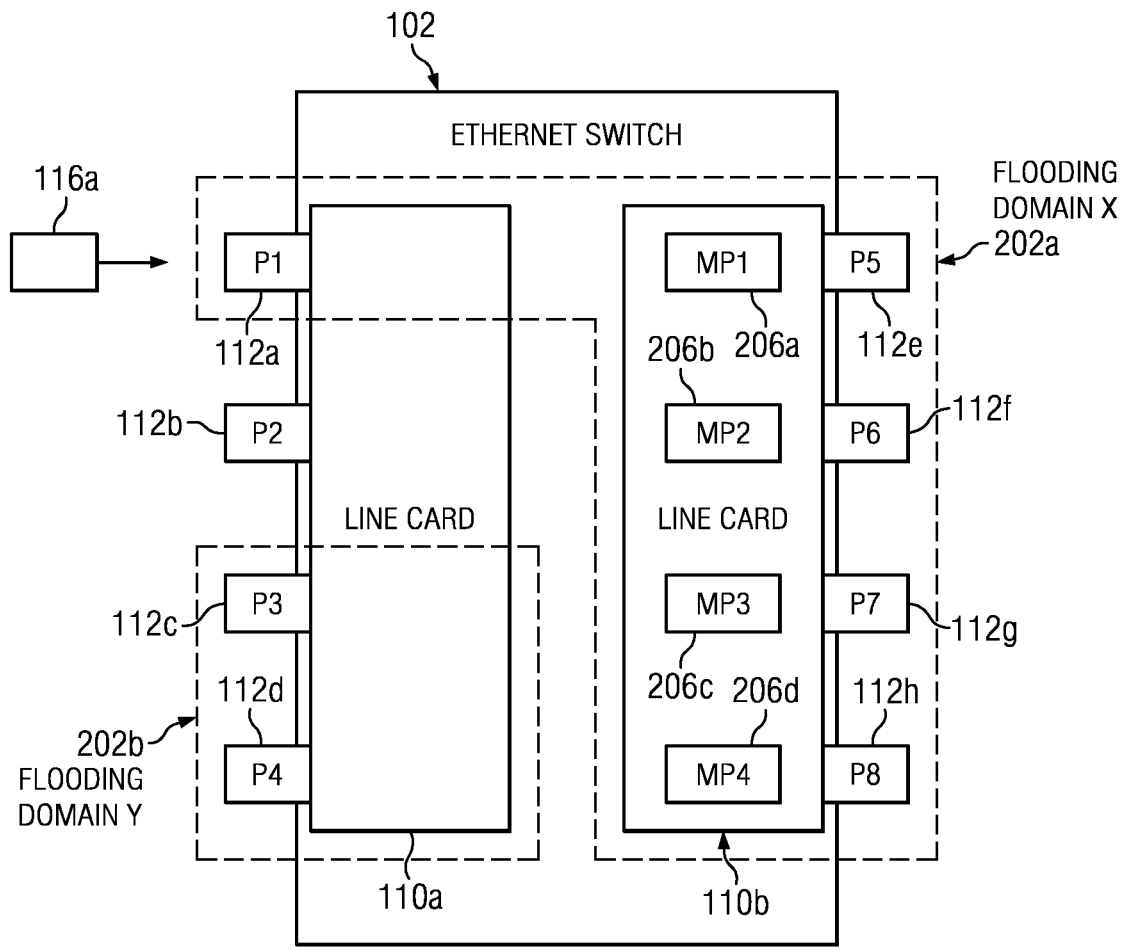
FIG. 2 is an illustration of an example assignment of one or more ports to a flooding domain, in accordance with embodiments of the present disclosure.

FIG. 2 is an illustration of an example assignment of one or more logical ports 112 to flooding domains. In the example of FIG. 2, ports P1, P5, P6, P7, and P8 are assigned to flooding domain 202a, while ports P3 and P4 are assigned to flooding domain 202b. Association of ports with flooding domains may be accomplished by processor 106, switching fabric 114, or any other suitable portion of switch 102. Flooding domains 202 may be associated with a VLAN. A flooding domain 202 may represent all logical ports 112 of switch 102 that may be flooded if the actual location of the destination of inbound frame 116a is not known. Such ports may be flooded by forwarding inbound frame 116a to each network destination 104 coupled to each such logical port 112. In the example of FIG. 2, an inbound frame 116a may be received on port P1. For example, if inbound frame 116a contains a destination MAC address of "0000.0000.1111," and no such entry exists in the tables associated with the flooding domain, then the frame may be forwarded through ports P5, P6, P7, and P8. If such an address was known in the tables associated with the flooding domain, then the entry for the address would identify the appropriate egress port through which the frame would be sent. The logical ports 112 of switch 102 may be arranged into flooding domains 202 in any suitable fashion. In one embodiment, the ports logical 112 of switch 102 may be rearranged during operation of the switch 102. A logical port 112 of switch 102 may be associated with more than one flooding domain 202. In such a case, such a logical port 112 may forward information assigned to more than one flooding domain to the network destination 104 coupled to such logical port 112.

In some embodiments, a plurality of logical ports 112 may reside on a single physical port. Because certain logical ports 112 may be both members of a flooding domain 202 and resident on the same physical port, traffic flowing through such physical ports may be subject to hairpinning, in which traffic ingressing on a particular physical port may egress from the same physical port 112.

As shown in FIG. 2, switch 102 may include one or more maintenance points 206 (e.g., maintenance points 206a-206d). A maintenance point 206 may include an end point or intermediate point of a group of network components associated with a particular maintenance level and may be configured to communicate management traffic, for example connectivity fault management (CFM) messages, to a peer maintenance point of the same maintenance level. Such CFM messages may include heartbeat or hello messages (e.g., CCMs), loopback messages, linktrace messages, and alarm indication suppression messages. In certain embodiments, a maintenance point 206 may include a Maintenance Entity Group End Point (MEP) or a Maintenance Group Intermediate Point (MIP) in accordance with a SOAM standard (e.g., IEEE 802.1ag). A MEP may comprise an UP-MEP or a DOWN-MEP. A UP-MEP may comprise a MEP that communicates SOAM messages via a switching fabric (e.g., switching fabric 114 of switch 102) for communication to a remote node. On the other hand, a DOWN-MEP may comprise a MEP that communicates SOAM messages via a logical port 112 of a line card 110 on which the DOWN-MEP is instatiated. Although switch 102 is depicted in FIG. 2 as having a particular number of maintenance points, switch 102 may include any suitable number of maintenance points 206. As shown in FIG. 2, maintenance points 206 may be instantiated on a line card 110 or other suitable component of switch 102, and/or may each be associated with a particular logical port 112 of a line card 110.

As described in the Background section above, the sharing of a Media Access Control (MAC) address for a line card 110 by a plurality of maintenance points 206 associated with the line card 110 may have disadvantages when used in accordance with traditional standards and approaches. In order to reduce and/or eliminate these and/or other disadvantages, the various maintenance points 206 associated with a line card 110 may be configured as described in greater detail below.

In operation, switch 102, a component thereof, and/or a program of instructions embodied in memory 108 and executable by processor 106 may designate, out of a plurality of maintenance points 206 associated with a line card 110, one UP-MEP or one MIP as a primary maintenance point 206. All other UP-MEPs and MIPs associated with the line card may be designated as secondary maintenance end points 206. Maintenance points 206 associated with a line card 110 and/or the line card 110 itself may be further configured such that source MAC addresses are learned and stored in the table 120 associated with the line card 110 only for SOAM frames sent from the primary maintenance point 206, and source MAC addresses are not learned for SOAM messages communicated from secondary maintenance points or DOWN-MEPs. In addition, maintenance points 206 associated with a line card 110 and/or the line card 110 itself may be configured such that certain SOAM frames (e.g., loopback and/or linktrace messages) originate only from the primary maintenance point 206. Also, maintenance points 206 associated with a line card 110 and/or the line card 110 itself may be configured such that certain SOAM frames (e.g., unidirectional loopback and/or linktrace messages) received by a MIP designated as a secondary maintenance point are dropped only if the frame arrives from an "up" direction (e.g., via switching fabric 114) and the frame is to be terminated. Furthermore, maintenance points 206 associated with a line card 110 and/or the line card 110 itself may be configured such that certain SOAM frames (e.g., loopback and/or linktrace messages) may be dropped when received by a secondary maintenance point (other than unidirectional messages received by a MIP, as described in the previous sentence).

Figure 3:
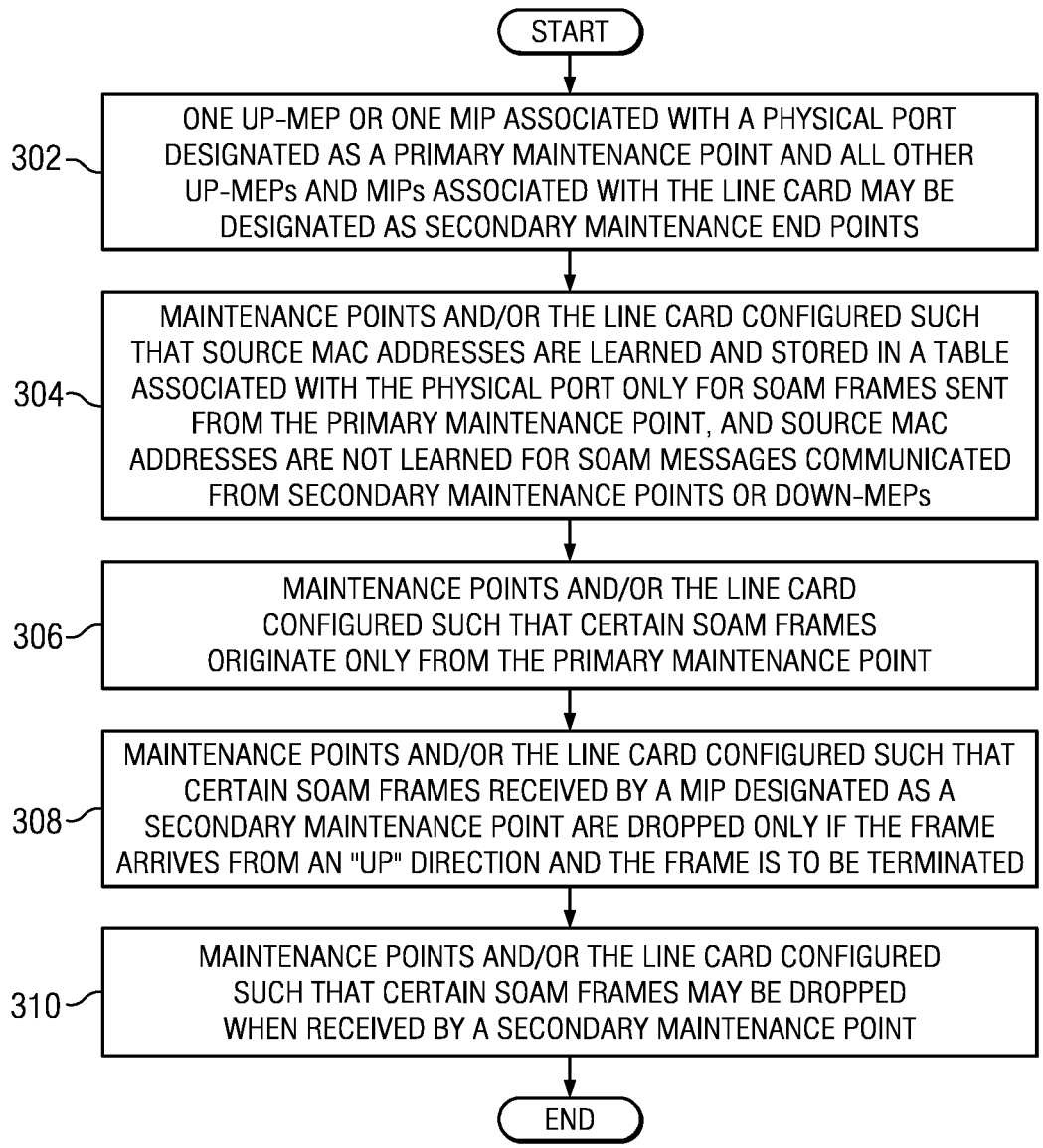
FIG. 3 is a flow chart of an example method for implementing Service Operation, Administration, and Management for hairpinned services, in accordance with embodiments of the present disclosure.

FIG. 3 illustrates a flow chart of an example method 300 for configuring a line card and maintenance points associated therewith for hairpinned Ethernet services, in accordance with embodiments of the present disclosure. Method 300 may be performed by processor 106 (e.g., processor 106 reading and executing a program of instructions stored in memory 108) or another component of system 100. In addition or alternatively, method 300 may be performed by a line card 110 (e.g., by a processor or other hardware residing on line card 110). According to one embodiment, method 300 may begin at step 302. As noted above, teachings of the present disclosure may be implemented in a variety of configurations system 100. As such, the preferred initialization point for method 300 and the order of the steps 302-310 comprising method 300 may depend on the implementation chosen.

At step 302, one UP-MEP or one MIP, out of a plurality of maintenance points associated with a physical port, may be designated as a primary maintenance point, while all other UP-MEPs and MIPs associated with the line card may be designated as secondary maintenance end points 206.

At step 304, maintenance points associated with the physical port and/or the line card may be further configured such that source MAC addresses are learned and stored in a table associated with the line card only for SOAM frames sent from the primary maintenance point, and source MAC addresses are not learned for SOAM messages communicated from secondary maintenance points or DOWN-MEPs. At step 306, maintenance points associated with the physical port and/or the line card may be configured such that certain SOAM frames (e.g., loopback and/or linktrace messages) originate only from the primary maintenance point.

At step 308, maintenance points associated with the physical port and/or the line card may be configured such that certain SOAM frames (e.g., unidirectional loopback and/or linktrace messages) received by a MIP designated as a secondary maintenance point are dropped only if the frame arrives from an "up" direction (e.g., via a switching fabric) and the frame is to be terminated. At step 310, maintenance points associated with the physical port and/or the line card may be configured such that certain SOAM frames (e.g., loopback and/or linktrace messages) may be dropped when received by a secondary maintenance point (other than unidirectional messages received by a MIP in step 308). After completion of step 310, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using system 100 or any other system operable to implement method 300. In certain embodiments, method 300 may be implemented partially or fully in software and/or firmware embodied in computer-readable media.

A component of system 100 may include an interface, logic, memory, and/or other suitable element. An interface receives input, sends output, processes the input and/or output, and/or performs other suitable operations. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. For the purposes of this disclosure, computer-readable media and/or computer-executable storage media may include any instrumentality or aggregation of instrumentalities that may retain data and/or instructions for a period of time. Computer-readable media and/or computer-executable storage media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other tangible, non-transitory media; and/or any combination of the foregoing.

Modifications, additions, or omissions may be made to system 100 without departing from the scope of the invention. The components of system 100 may be integrated or separated. Moreover, the operations of system 100 may be performed by more, fewer, or other components. Additionally, operations of system 100 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A switch, comprising:
   a line card, the line card including a table of addresses and at least one maintenance point associated with a physical port of the line card;
   a processor configured to:
   designate one of the at least one maintenance point as a primary maintenance point, the primary maintenance point comprising either a UP-Maintenance Entity Group End Point (UP-MEP) or one Maintenance Entity Group Intermediate Point (MIP);
   configure the line card such that the line card stores source addresses of Service Operation, Administration, and Management (SOAM) frames communicated by the primary maintenance point; and
   configure the line card such that the line card does not store source addresses of Service Operation, Administration, and Management frames communicated by maintenance points associated with the line card other than the primary maintenance point.

2. A switch according to claim 1, the processor further configured to designate one or more maintenance points other than primary maintenance point as secondary maintenance points.

3. A switch according to claim 2, the processor further configured to configure the line card such that certain SOAM frames received by secondary maintenance points are dropped by the secondary maintenance points.

4. A switch according to claim 3, wherein the certain SOAM frames comprise at least one of a loopback message and a linktrace message.

5. A switch according to claim 2, the processor further configured to configure the line card such that certain SOAM frames received by MIPs designated as secondary maintenance points are dropped by the MIPs if the frame arrives from a switching fabric of the switch and the frame is to be terminated.

6. A switch according to claim 5, wherein the certain SOAM frames comprise at least one of a unidirectional loopback message and a unidirectional linktrace message.

7. A switch according to claim 1, the processor further configured to configure the line card such that certain SOAM frames originate only from the primary maintenance end point.

8. A switch according to claim 1, the processor residing on the line card.

9. A method comprising:
   designating one of at least one maintenance point associated with a physical port of a line card as a primary maintenance point, the primary maintenance point comprising either a UP-Maintenance Entity Group End Point (UP-MEP) or one Maintenance Entity Group Intermediate Point (MIP);
   configuring the line card such that the line card stores source addresses of Service Operation, Administration, and Management (SOAM) frames communicated by the primary maintenance point; and
   configuring the line card such that the line card does not store source addresses of Service Operation, Administration, and Management frames communicated by maintenance points associated with the physical port other than the primary maintenance point.

10. A method according to claim 9, further comprising configuring the line card to designate one or more maintenance points other than primary maintenance point as secondary maintenance points.

11. A method according to claim 10, further comprising configuring the line card such that certain SOAM frames received by secondary maintenance points are dropped by the secondary maintenance points.

12. A method according to claim 11, wherein the certain SOAM frames comprise at least one of a loopback message and a linktrace message.

13. A method according to claim 10, further comprising configuring the line card such that certain SOAM frames received by MIPs designated as secondary maintenance points are dropped by the MIPs if the frame arrives from a switching fabric of the switch and the frame is to be terminated.

14. A method according to claim 13, wherein the certain SOAM frames comprise at least one of a unidirectional loopback message and a unidirectional linktrace message.

15. A method according to claim 9, further comprising configuring the line card such that certain SOAM frames originate only from the primary maintenance end point.

16. A non-transitory computer readable medium comprising computer-executable instructions, the instructions readable by a processor, the instructions, when read and executed, for causing the processor to:
   designate one of at least one maintenance point associated with a physical port of a line card as a primary maintenance point, the primary maintenance point comprising either a UP-Maintenance Entity Group End Point (UP-MEP) or one Maintenance Entity Group Intermediate Point (MIP);
   configure the line card such that the line card stores source addresses of Service Operation, Administration, and Management (SOAM) frames communicated by the primary maintenance point; and configure the line card such that the line card does not store source addresses of Service Operation, Administration, and Management frames communicated by maintenance points associated with the physical port other than the primary maintenance point.

17. A non-transitory computer readable medium according to claim 16, the instructions further for causing the processor to configure the line card to designate one or more maintenance points other than primary maintenance point as secondary maintenance points.

18. A non-transitory computer readable medium according to claim 17, the instructions further for causing the processor to configure the line card such that certain SOAM frames received by secondary maintenance points are dropped by the secondary maintenance points.

19. A non-transitory computer readable medium according to claim 18, wherein the certain SOAM frames comprise at least one of a loopback message and a linktrace message.

20. A non-transitory computer readable medium according to claim 17, the instructions further for causing the processor to configure the line card such that certain SOAM frames received by MIPs designated as secondary maintenance points are dropped by the MIPs if the frame arrives from a switching fabric of the switch and the frame is to be terminated.

21. A non-transitory computer readable medium according to claim 20, wherein the certain SOAM frames comprise at least one of a unidirectional loopback message and a unidirectional linktrace message.

* * * * *